(12) United States Patent
Giovannucci et al.

(10) Patent No.: US 7,546,865 B2
(45) Date of Patent: Jun. 16, 2009

(54) MACHINE FOR ASSEMBLING AND DISASSEMBLING A TYRE FITTED WITH A RIGID INNER RUN-FLAT RING

(75) Inventors: Fabrizio Giovannucci, Rome (IT); Vittorio Collepardi, Aprilia (IT)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 11/785,002

(22) Filed: Apr. 13, 2007

(65) Prior Publication Data

US 2007/0251649 A1 Nov. 1, 2007

(30) Foreign Application Priority Data

Apr. 14, 2006 (IT) ............... TO2006A0285

(51) Int. Cl.
*B60C 25/132* (2006.01)
(52) U.S. Cl. ............... 157/1.24; 157/14; 157/1.1
(58) Field of Classification Search ............. 157/1.1, 157/1.17, 1, 1.22, 1.24, 1.26, 14, 16–17, 157/19–21; 29/802, 894.31; 152/381.6, 152/520; 156/394.1
See application file for complete search history.

(56) References Cited

U.S. PATENT DOCUMENTS

| | | | | |
|---|---|---|---|---|
| 4,251,906 A | * | 2/1981 | Jacquemin | 29/451 |
| 4,694,875 A | * | 9/1987 | Goebel | 157/1.24 |
| 4,744,402 A | * | 5/1988 | St-Hilaire | 157/1.1 |
| 5,490,552 A | * | 2/1996 | Vignoli | 157/1.24 |
| 5,623,981 A | * | 4/1997 | Cunningham et al. | 157/1 |
| 6,056,034 A | * | 5/2000 | Matnick | 157/1.24 |
| 6,192,959 B1 | | 2/2001 | Spaggiari | |
| 6,237,666 B1 | * | 5/2001 | Magnani | 157/1.3 |
| 6,257,299 B1 | * | 7/2001 | Toriselli | 157/1.17 |
| 6,609,293 B2 | * | 8/2003 | Corghi | 29/802 |
| 6,842,958 B2 | * | 1/2005 | Gonzaga | 29/446 |
| 2003/0098129 A1 | * | 5/2003 | Spaggiari | 156/394.1 |
| 2004/0055712 A1 | * | 3/2004 | Corghi | 157/1.24 |
| 2004/0074610 A1 | | 4/2004 | Abinal | |

FOREIGN PATENT DOCUMENTS

EP 0 987 130 A2 3/2000

\* cited by examiner

*Primary Examiner*—D. S Meislin
(74) *Attorney, Agent, or Firm*—Oliff & Berridge, PLC

(57) ABSTRACT

A machine for assembling and disassembling a tyre fitted with a rigid inner run-flat ring, wherein the machine is a tyre removing machine having a turntable; a tool column located alongside the turntable and having a guide located alongside and parallel to the turntable; a slide mounted to run along the guide; and an actuating device for moving the slide along the guide; the tyre removing machine having tooling defined by a first tool fitted to the turntable to support the tyre and the rigid ring, and by a second tool fitted to the slide and movable with the slide along the tool column to engage the rigid ring and move the rigid ring with respect to the tyre.

19 Claims, 6 Drawing Sheets

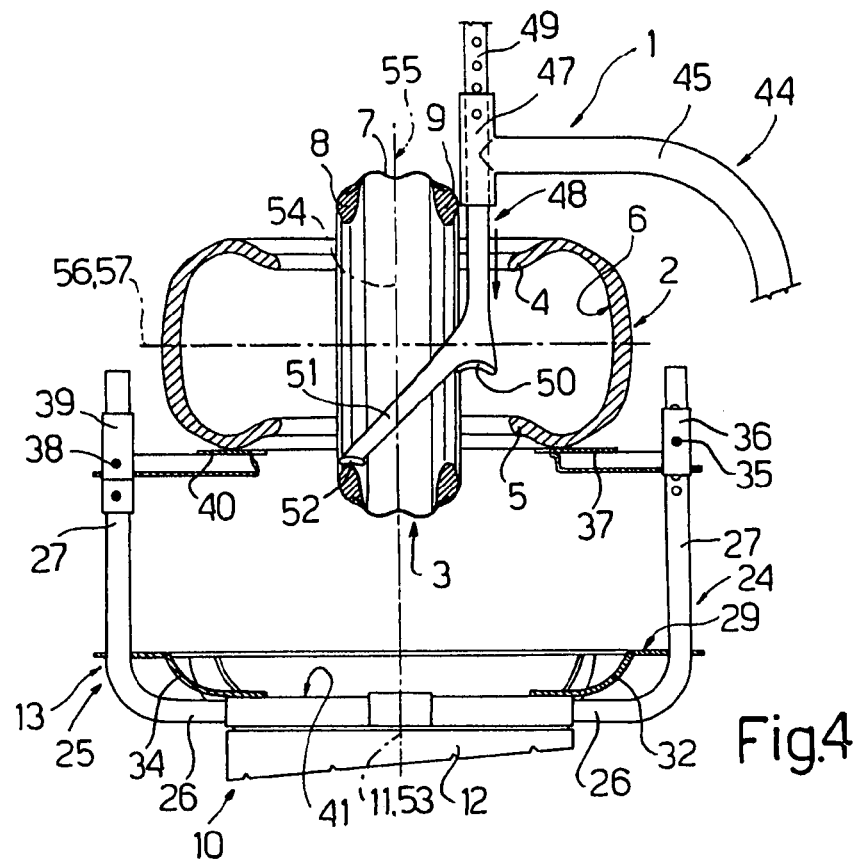
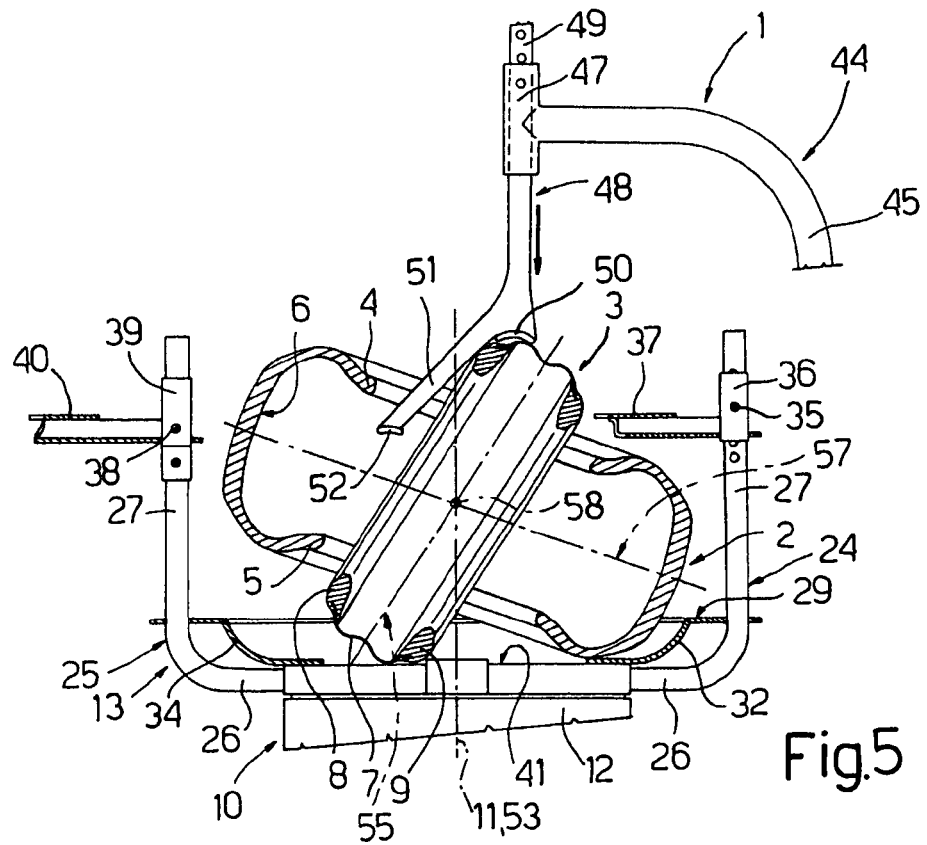

MACHINE FOR ASSEMBLING AND DISASSEMBLING A TYRE FITTED WITH A RIGID INNER RUN-FLAT RING

The present invention relates to a machine for assembling and disassembling a tyre fitted with a rigid inner run-flat ring.

BACKGROUND OF THE INVENTION

In the tyre business, tyres of the above type are normally assembled and disassembled using special, relatively complex, high-cost powered devices completely separate from the tyre removing machines used to assemble and remove the tyre to and from the rim.

SUMMARY OF THE INVENTION

It is an object of the present invention to eliminate the need for said special devices.

According to the present invention, there is provided a machine for assembling and disassembling a tyre fitted with a rigid inner run-flat ring, as claimed in the attached Claims.

BRIEF DESCRIPTION OF THE DRAWINGS

A non-limiting embodiment of the present invention will be described by way of example with reference to the accompanying drawings, in which:

FIGS. 4 to 6 show partial, larger-scale, partly sectioned views of a first operating sequence of the FIG. 2 machine;

DETAILED DESCRIPTION OF THE INVENTION

Figure 2:
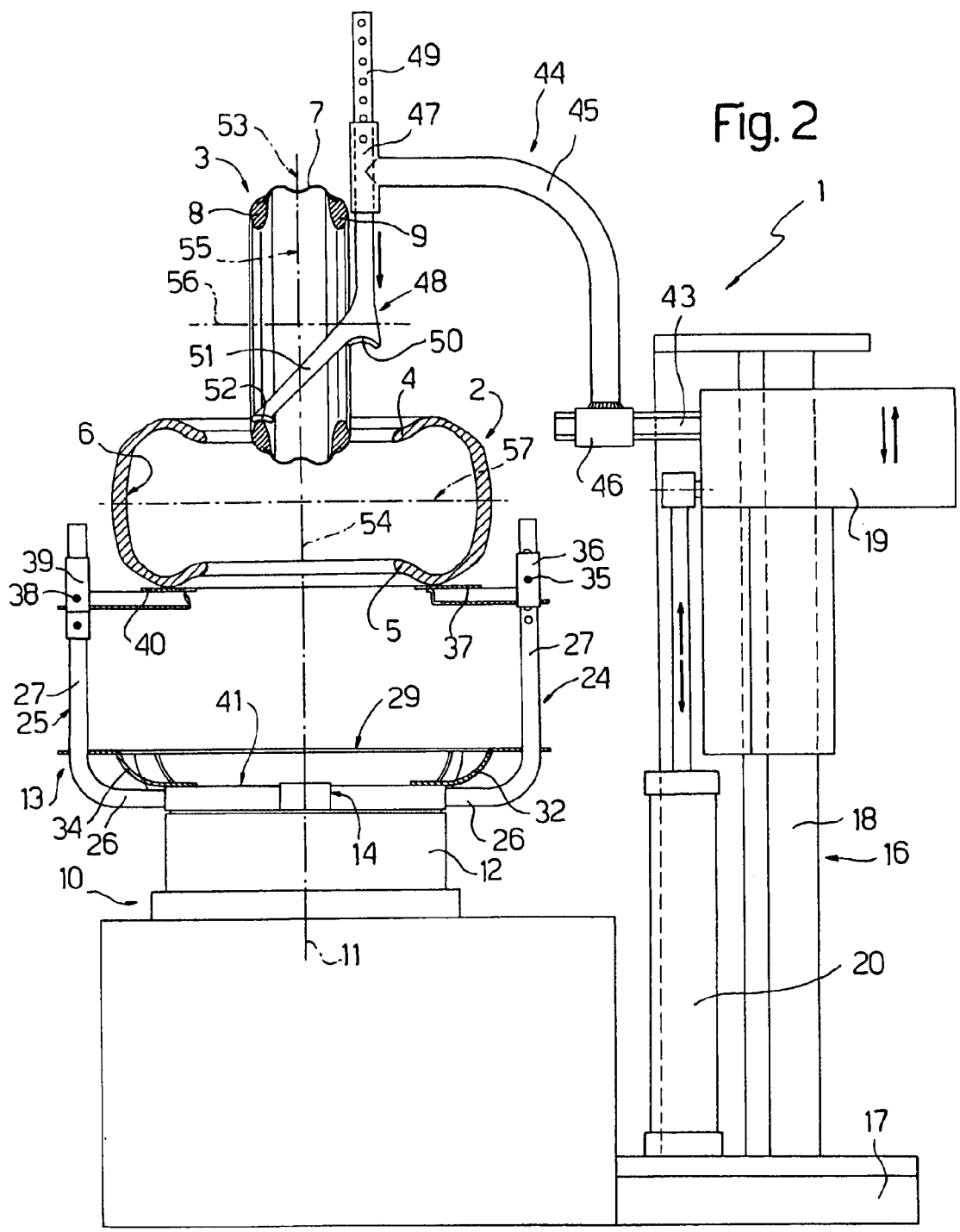
FIG. 2 shows a schematic side view, with parts in section and parts removed for clarity, of a preferred embodiment of the machine according to the present invention.

Number 1 in FIG. 2 indicates as a whole a machine —actually a conventional tyre removing machine—equipped with accessories for assembling and disassembling a conventional tyre 2 fitted with a known rigid inner run-flat ring 3.

Figure 1:
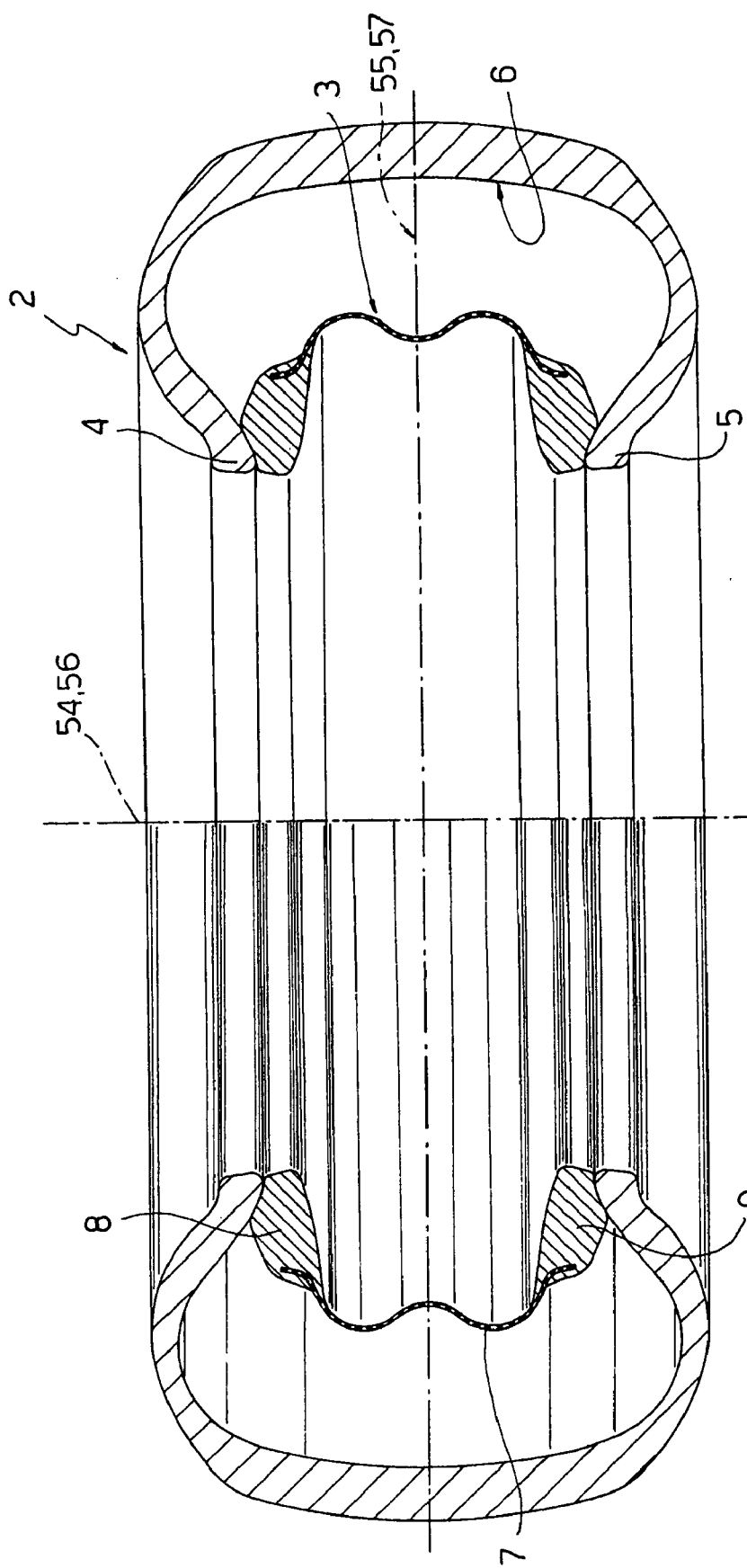
FIG. 1 shows an axial section of a tyre fitted with a rigid inner run-flat ring.

As shown more clearly in FIG. 1, tyre 2 comprises two beads 4 and 5 defining the ends of a toroidal chamber 6. Rigid ring 3 is housed inside toroidal chamber 6, and comprises an undulated toroidal metal central portion 7, the maximum outside diameter of which is larger than the inside diameter of beads 4 and 5 and slightly larger than the maximum diameter of toroidal chamber 6 minus the maximum radial depth of toroidal chamber 6; and two beads 8 and 9 made of elastomeric material and of substantially the same inside diameter as beads 4 and 5.

As shown more clearly in FIG. 2, tyre removing machine 1 comprises a powered turntable 10 having a vertical axis 11 and, on top, a height-adjustable plate 12, which rotates about axis 11, supports a tub-shaped tool 13 with its concavity facing upwards, and has a known locating device 14 for engaging a bottom flange 15 of tub-shaped tool 13 to lock tub-shaped tool 13 radially in a position coaxial with axis 11 when tub-shaped tool 13 is placed on plate 12 with bottom flange 15 facing downwards.

Tyre removing machine 1 also comprises a tool column 16 located alongside turntable 10 and in turn comprising a base 17, from which extends upwards a vertical prismatic guide 18 for a slide 19 moved along prismatic guide 18 by a single hydraulic or pneumatic jack 20 interposed between slide 19 and base 17.

Slide 19 is fitted with a number of tools—not shown for the sake of simplicity—for assembling and disassembling a wheel (not shown) comprising tyre 2, relative rigid ring 3, and a relative rim (not shown).

Figure 3:
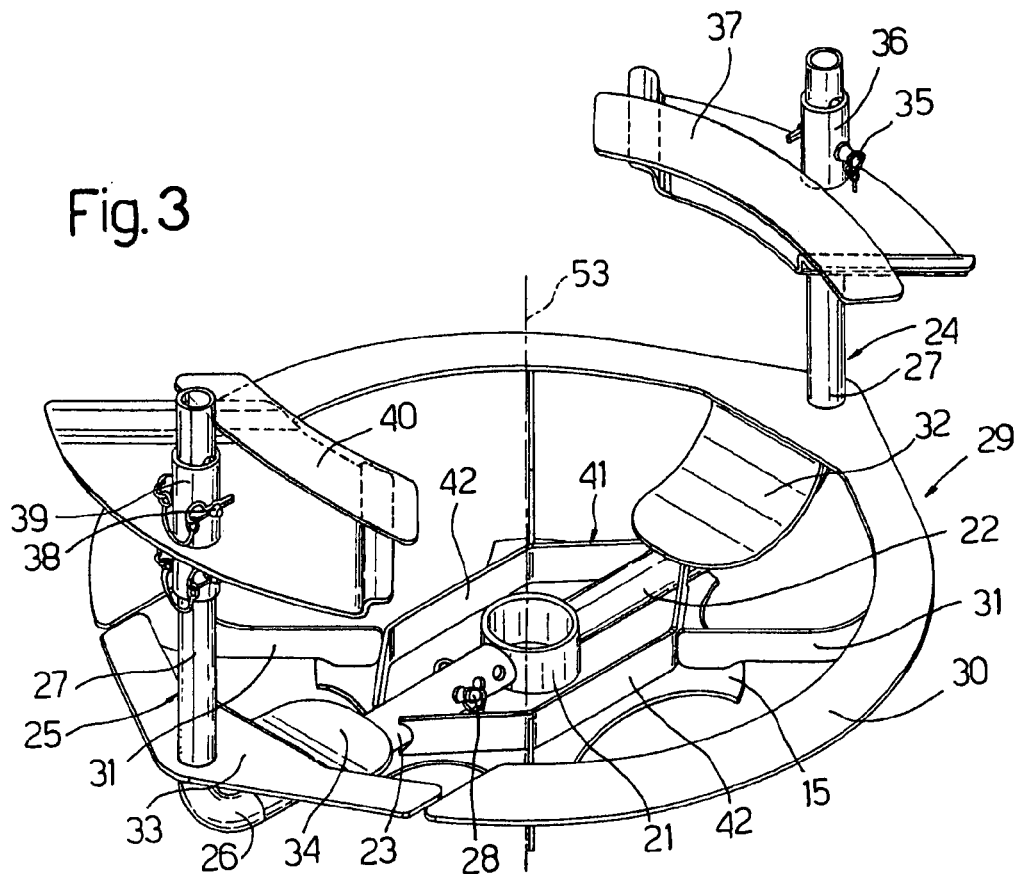
FIG. 3 shows a larger-scale view in perspective of a detail in FIG. 2.
Figure 7:
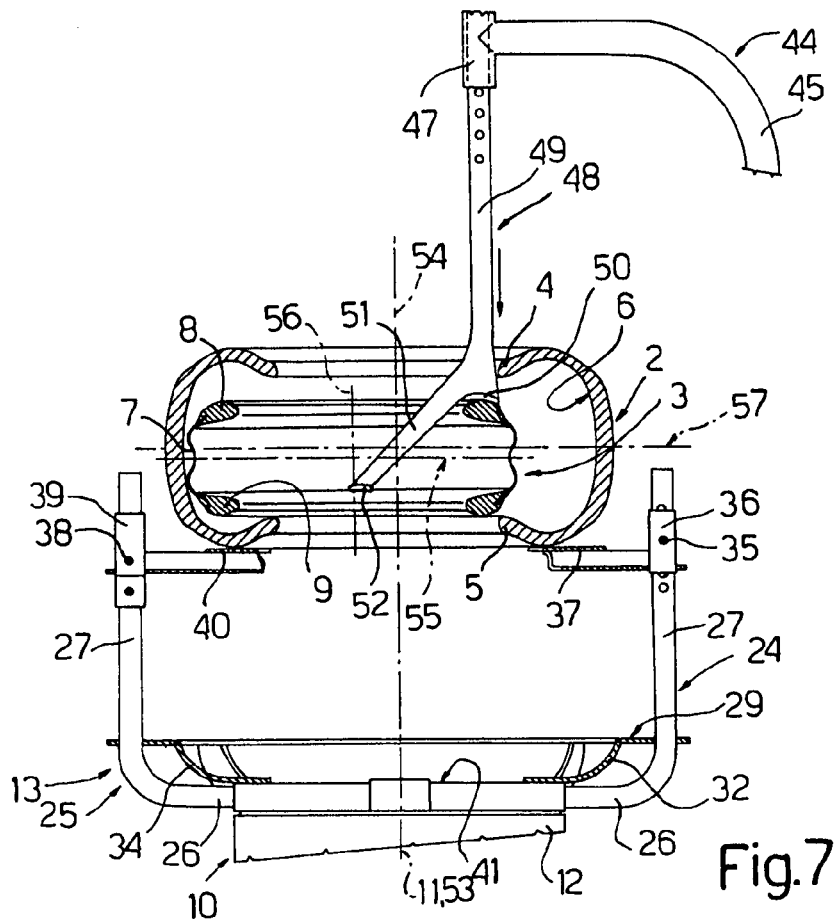
FIGS. 7 to 10 show partial, larger-scale, partly sectioned views of a second operating sequence of the FIG. 2 machine.

As shown more clearly in FIG. 3, in tub-shaped tool 13, a tube 21 extends through bottom flange 15, is maintained, in use, coaxial with axis 11 by locating device 14, and is fitted with the facing ends of two coaxial, diametrically opposite sleeves 22 and 23 engaged by specular tubular members 24 and 25 respectively. Tubular members 24 and 25 are L-shaped, lie in a diametrical plane of axis 11 to define two supporting ribs of tub-shaped tool 13, and comprise respective bottom arms 26 perpendicular to axis 11 and coaxial with each other and with sleeves 22, 23; and respective top arms 27 parallel to each other and to axis 11, and located in said diametrical plane, on opposite sides of axis 11. More specifically, bottom arm 26 of tubular member 24 is integral with sleeve 22, whereas bottom arm 26 of tubular member 25 engages sleeve 23 in sliding manner, and can be fixed selectively in any of a number of given axial positions with respect to sleeve 23, by means of a diametrical pin 28. Close to their respective bases, top arms 27 support an annular rib 29 coaxial with axis 11 and lying in a plane perpendicular to axis 11. Annular rib 29 comprises a fixed portion 30, which is integral with tubular member 24, extends roughly 3200 about axis 11, and is connected to bottom flange 15 by curved radial arms 31, and to sleeve 22 by a scoop 32; and a movable portion 33 movable radially with tubular member 25 and connected to a top end of a scoop 34, which is specular with respect to scoop 32 and has a bottom end resting on sleeve 23.

A sleeve 36 is fixed, in an axially adjustable position, to top arm 27 of tubular member 24 by a removable radial pin 35, and is fitted with an annular segment-shaped plate 37 projecting, with respect to relative top arm 27, towards tubular member 25. Similarly, a sleeve 39 is fixed, in an axially and angularly adjustable position, to top arm 27 of tubular member 25 by a removable radial pin 38, and is fitted with an annular segment-shaped plate 40 projecting, with respect to relative top arm 27, towards tubular member 24. Plates 37 and 40 are adjusted so as to be coplanar with a plane perpendicular to axis 11, and, whereas plate 37 is always oriented towards axis 11 with respect to relative top arm 27, plate 40 is adjustable about relative top arm 27 to selectively assume a first position (FIG. 3) facing tubular member 24, and a second position facing outwards of tub-shaped tool 13, a concave bottom surface 41 of which is defined by scoops 32 and 34, by radial arms 31, and by two curved ribs 42 located on opposite sides of the diametrical plane—coincident with the FIG. 2 plane—defined by tubular members 24, 25 and extending upwards from bottom flange 15.

As shown in FIG. 2, slide 19 has a horizontal prismatic through guide (not shown) lying in said diametrical plane and engaged in sliding manner by a rod 43, which forms part of a removable accessory 44, can be fixed in any axial position to slide 19, and has an end portion projecting from slide 19 towards turntable 10. Accessory 44 also comprises an L-shaped bracket 45, one end of which is fitted with a transverse sleeve 46 fitted to the portion of rod 43 projecting from slide 19, and the other end of which is fitted with another transverse sleeve 47, which has an axis parallel to axis 11, lies in said diametrical plane, and is located over plate 12, on the same side of axis 11 as tool column 16. Accessory 44 also comprises a pressure tool 48, also located in said diametrical plane and in turn comprising a rod 49 fitted in an axially adjustable position through sleeve 47 and terminating, at the end facing plate 12, with a pad 50; and an appendix 51, also located in said diametrical plane, and which slopes downwards towards axis 11 from a portion of rod 49 just above pad 50, and terminates, at the end facing plate 12, with a pad 52 located on the opposite side of axis 11 to pad 50, and separated from pad 50 by a distance, measured crosswise to axis 11, greater than the distance between beads 8 and 9.

Below are described an insertion sequence (FIGS. 2 and 4-6) to insert rigid ring 3 inside toroidal chamber 6, and an extraction sequence (FIGS. 7-10) to extract rigid ring 3 from toroidal chamber 6.

Before commencing the insertion sequence (FIG. 2), slide 19 is moved into the topmost position; tub-shaped tool 13 is fixed to plate 12 with its concavity facing upwards, and with its own axis 53 (FIG. 2) coincident with axis 11; the height of sleeves 36 and 39 and the radial position of tubular member 25 are adjusted according to the size of tyre 2; plate 40 is locked angularly in the inner position, i.e. facing plate 37; and tyre 2 is placed flat on the support defined by plates 37 and 40, with its bead 5 facing downwards, and with its own axis 54 (FIG. 2) substantially coaxial with axis 11. At this point, rigid ring 3, whose outside diameter is only slightly greater than the inside diameter of beads 4 and 5, and whose thickness is less than the height of toroidal chamber 6, is placed on-edge on tyre 2, with central portion 7 contacting bead 4, and so that an equatorial plane 55 (FIG. 2) of rigid ring 3 contains axis 11, and an axis 56 (FIG. 2) of rigid ring 3 is parallel to rod 43.

Next, rod 43 is moved forward to insert appendix 51 inside rigid ring 3; and rod 49 is lowered, with respect to sleeve 47, to lower pad 52 onto the inner periphery of bead 8, and is then locked axially to sleeve 47.

Jack 20 is then operated to move slide 19 down prismatic guide 18 and so insert rigid ring 3 on-edge inside tyre 2, by pressure tool 48 exerting thrust on rigid ring 3, and simultaneously deform beads 4 and 5. This insertion stage is completed (FIG. 4) when axis 56 of rigid ring 3 lies on an equatorial plane 57 of the tyre.

Figure 6:
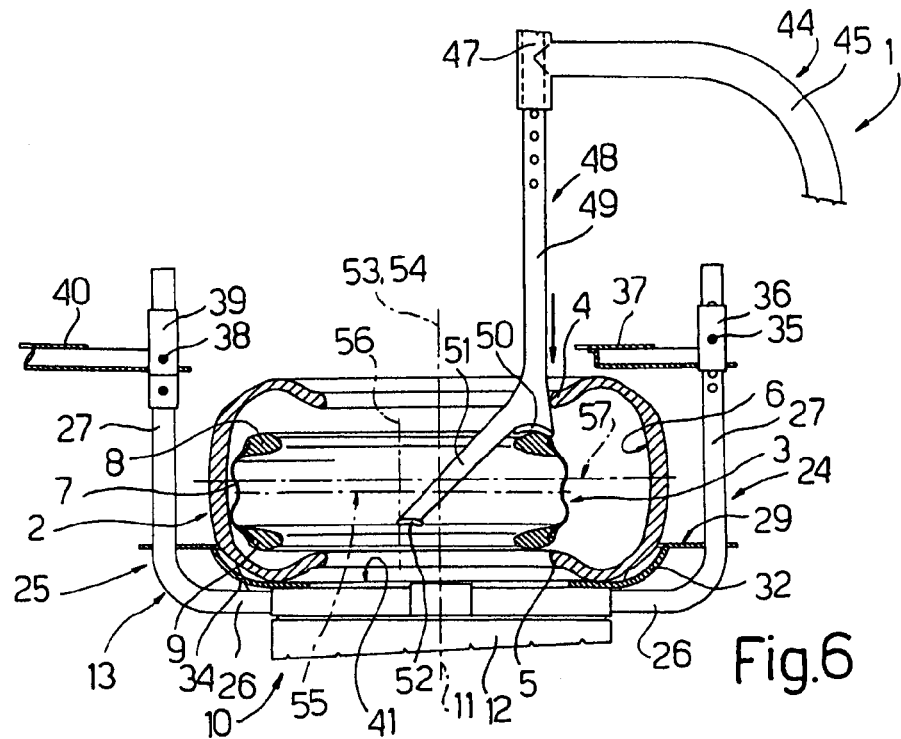

At this point, appendix 51 is extracted from rigid ring 3 by rotating rod 49 inside sleeve 47 and raising slide 19; plate 40 is locked angularly in the outer position (FIG. 5); and the tyre 2-rigid ring 3 assembly is placed on bottom surface 41 of tub-shaped tool 13, with tyre 2 tilted and laterally contacting scoop 32, and with rigid ring 3 tilted, laterally contacting ribs 42, and with its highest point positioned directly beneath pad 50. When slide 19 is next lowered, pad 50 acts on rigid ring 3 to rotate tyre 2 and rigid ring 3 in opposite directions (FIG. 5) on bottom surface 41 and about an instantaneous axis 58 perpendicular to the FIG. 5 plane and substantially coincident with the intersection of equatorial planes 55 and 57, and so insert rigid ring 3 completely inside toroidal chamber 6 (FIG. 6). At this point, tyre 2, fitted completely with rigid ring 3, is laid flat inside, and can be extracted from, tub-shaped tool 13.

Before commencing the extraction sequence (FIG. 7), slide 19 is moved into the topmost position; tub-shaped tool 13 is fixed to plate 12 with its concavity facing upwards, and with its own axis 53 (FIG. 3) coincident with axis 11; the height of sleeves 36 and 39 and the radial position of tubular member 25 are adjusted according to the size of tyre 2; plate 40 is locked angularly in the inner position, i.e. facing plate 37; tyre 2 is placed flat on the support defined by plates 37 and 40, with its bead 5 facing downwards, and with its own axis 54 (FIG. 1) substantially coaxial with axis 11; and rigid ring 3 is moved laterally, inside toroidal chamber 6, away from tool column 16, so that a portion of bead 8 is positioned radially inwards of the relative portion of bead 4 and directly accessible by pad 50.

Next, rod 43 is moved forward to position pad 50 directly over said portion of bead 8; and rod 49 is lowered, with respect to sleeve 47, to lower pad 50 (FIG. 7) onto said portion of bead 8, and is then locked axially to sleeve 47.

Figure 8:
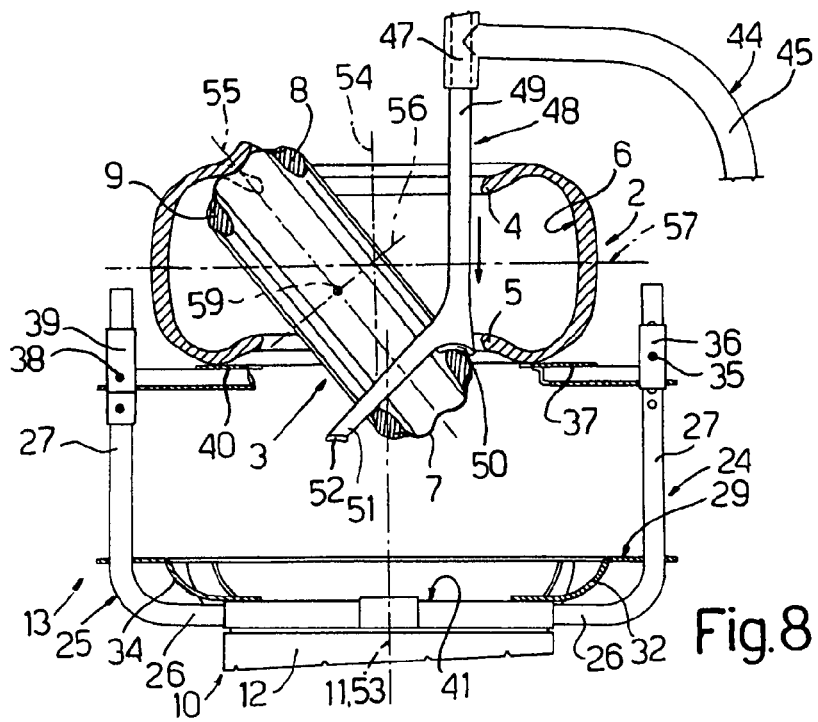
Figure 9:
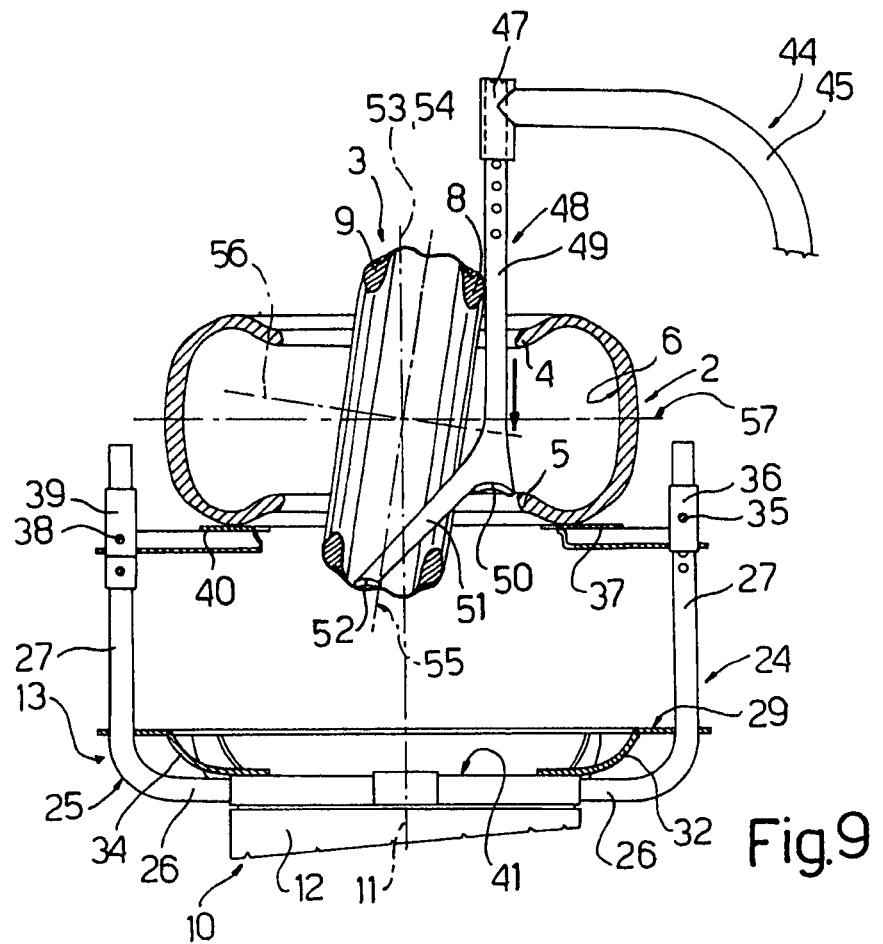
Figure 10:
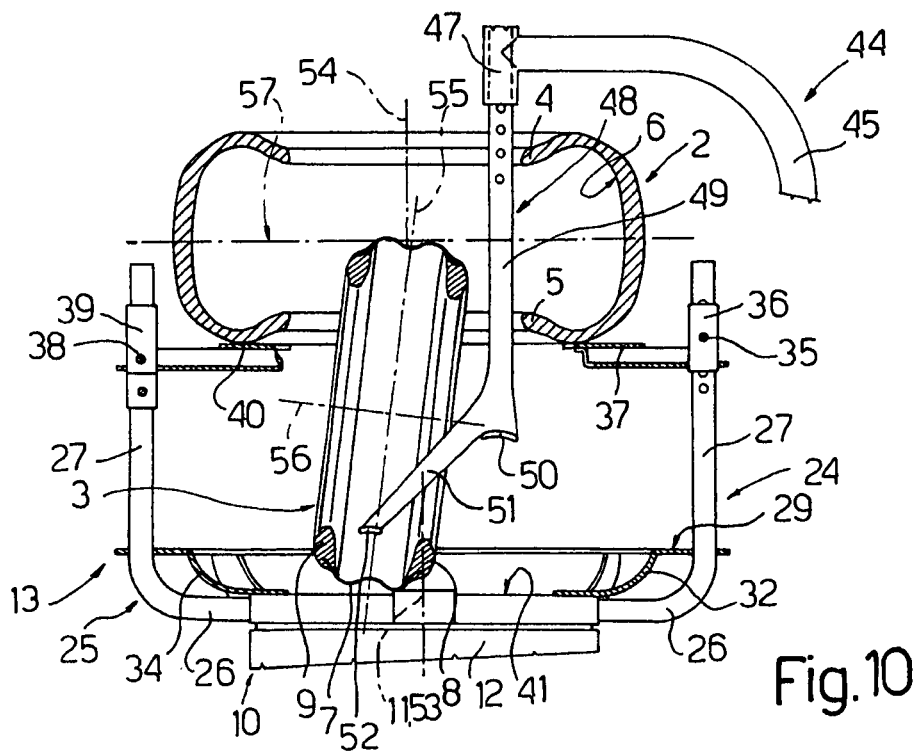

Jack 20 is then operated to move slide 19 down prismatic guide 18 (FIG. 8) and produce a simultaneous rotation-translation movement of rigid ring 3 about an instantaneous axis 59 perpendicular to the FIG. 8 plane and substantially lying in equatorial plane 55, so that part of rigid ring 3 is extracted downwards from toroidal chamber 6. The above rotation continues, by pressure tool 48 exerting thrust on rigid ring 3, until rigid ring 3 is positioned substantially on edge with respect to tyre 2 (FIG. 9).

At this point, pad 50 is detached from bead 8 by raising slide 19 until pad 52 is positioned higher than the bottom portion of bead 9; rigid ring 3 is then manually rotated further by the operator to position central portion 7 of rigid ring 3 directly beneath pad 52; and slide 19 is lowered (FIG. 9) to bring pad 52 into direct contact with the inner surface of central portion 7 of rigid ring 3.

When slide 19 is lowered further along prismatic guide 18, beads 4 and 5 are deformed; rigid ring 3 is extracted (FIG. 10) on-edge from tyre 2, by pressure tool 48 exerting thrust on central portion 7 of rigid ring 3; and rigid ring 3 drops onto bottom surface 41 of tub-shaped tool 13.

The advantages of tyre removing machine 1, as compared with known assembly and disassembly devices, are obvious, considering that, on tyre removing machine 1, rigid ring 3 is inserted and extracted using a power member—in this case, jack 20—already provided on tyre removing machine 1—for other purposes, and by simply equipping tyre removing machine 1 with relatively low-cost, low-tech, compact, lightweight accessory tools—in this case, tub-shaped tool 13 and pressure tool 48.

The invention claimed is:

1. A machine for assembling and disassembling a tyre fitted with a rigid inner run-flat ring located inside a toroidal chamber of the tyre; the machine being a tyre removing machine comprising:

a turntable having an axis;

a tool column located alongside the turntable and having a guide parallel to said axis;

a slide mounted to run along the guide;

actuating means for moving the slide along the guide; and tooling for interacting with the tyre and the rigid inner run-flat ring, the tooling including:

a first tool which is fitted to the turntable to support the tyre and the rigid ring, and supports the tyre over the turntable and at a given distance from the turntable so that the rigid ring can be arranged transversally through a central channel of the tyre; and second tool fitted to the slide and movable with the slide along the tool column to engage the rigid ring and move the rigid ring with respect to the tyre and through the central channel of the tyre, wherein the first tool includes first and second supporting means for supporting the tyre, laid flat, in respective distinct positions along said axis, the second supporting means being located above the first supporting means along said axis, the second supporting means is substantially annular, and includes a first curved plate and a second curved plate coplanar with each other, crosswise to said axis, and diametrically opposite with respect to said axis, and said first and said second curved plates are adjustable in height with respect to the first supporting means.

2. A machine as claimed in claim 1, wherein the first and second tool are fitted removably to the turntable and the slide, respectively.

3. A machine as claimed in claim 1, wherein the first tool is a tub-shaped tool positioned on the turntable coaxially with said axis and with its concavity facing upwards; the first tool receiving the tyre laid flat.

4. A machine as claimed claim 1, wherein said second plate is movable between an inner position, in which the second plate is located over the first supporting means, and an outer position, in which the second plate is moved aside with respect to the first supporting means, to permit access by the tyre to the first supporting means.

5. A machine as claimed in claim 3, wherein the first supporting means are defined by a bottom of the first tool.

6. A machine as claimed in claim 1, wherein the second tool lies in a plane through said axis.

7. A machine as claimed in claim 1, wherein the second tool is a pressure tool comprising a first and a second pad, which are movable with the slide along said axis, and selectively engage the rigid ring to cause the rigid ring to translate along said axis with respect to the tyre, and to rotate with respect to the tyre about a further axis crosswise to said axis.

8. A machine as claimed in claim 7, wherein the first and second pad are located on opposite sides of said axis, and are offset in height, with the first pad located above the second pad.

9. A machine as claimed in claim 7, wherein the second tool comprises a rod parallel to said axis and connected in an axially adjustable position to the slide; the rod having an inclined lateral appendix extending through said axis and towards the turntable; the first pad being carried by the rod, and the second rod being carried by the appendix.

10. Tooling attachable to a tyre removing machine to assemble and disassemble, on the tyre removing machine, a tyre fitted with a rigid inner run-flat ring located inside a toroidal chamber of the tyre; the tyre changing machine being of the type comprising:
   a turntable having an axis;
   a tool column located alongside the turntable and having a guide parallel to said axis;
   a slide mounted to run along the guide; and
   actuating means for moving the slide along the guide; and
   the tooling for interacting with the tyre and the rigid inner run-flat ring, the tooling including:
      a first tool which fits onto the turntable to support the tyre and the rigid ring and supports the tyre over the turntable and at a given distance from the turntable so that the rigid ring can be arranged transversally through a central channel of the tyre; and
      a second tool which fits onto the slide, and is movable with the slide along the tool column to engage the rigid ring and move the rigid ring with respect to the tyre and through the central channel of the tyre, wherein
   the first tool includes first and second supporting means for supporting the tyre, laid flat, in respective distinct positions, the second supporting means being located above the first supporting means along said axis,
   the second supporting means is substantially annular, and includes a first curved plate and a second curved plate coplanar with each other, and which are positioned, in use, crosswise to said axis and diametrically opposite with respect to said axis, and
   said first and said second plates are adjustable in height with respect to the first supporting means.

11. Tooling as claimed in claim 10, wherein the first tool is a tub-shaped tool which fits onto the turntable coaxially with said axis and with its concavity facing upwards; the first tool receiving the tyre laid flat.

12. Tooling as claimed in claim 10, wherein said second plate is movable between an inner position, in which the second plate is located over the first supporting means, and an outer position, in which the second plate is moved aside with respect to the first supporting means, to permit access by the tyre to the first supporting means.

13. Tooling as claimed in claim 11, wherein the first supporting means are defined by a bottom of the first tool.

14. Tooling as claimed in claim 10, wherein the second tool lies, in use, in a plane through said axis.

15. Tooling as claimed in claim 1, wherein the second tool is a pressure tool comprising a first and a second pad, which are attachable to the slide to move with the slide along said axis, and to selectively engage the rigid ring to cause the rigid ring to translate along said axis with respect to the tyre, and to rotate with respect to the tyre about a further axis crosswise to said axis.

16. Tooling as claimed in claim 15, wherein the first and second pad, when attached to the slide, are located on opposite sides of said axis, and are offset in height, with the first pad located above the second pad.

17. Tooling as claimed in claim 15, wherein the second tool comprises a rod that can be positioned parallel to said axis and is connectable in an axially adjustable position to the slide; the rod having an inclined lateral appendix extending, in use, through said axis and towards the turntable; the first pad being carried by the rod, and the second pad being carried by the appendix.

18. A machine for assembling and disassembling a tyre fitted with a rigid inner run-flat ring located inside a toroidal chamber of the tyre, the machine being a tyre removing machine comprising:
   a turntable having an axis;
   a tool column located alongside the turntable and having a guide parallel to said axis;
   a slide mounted to run along the guide;
   actuating means for moving the slide along the guide; and
   tooling for interacting with the tyre and the rigid inner run-flat ring, the tooling including:
      a first tool, which is fitted to the turntable to support the tyre and the rigid ring and supports for the tyre over the turntable and at a given distance from the turntable so that the rigid ring can be arranged transversally through a central channel of the tyre; and
      a second tool fitted to the slide and movable with the slide along the tool column to engage the rigid ring and move the rigid ring with respect to the tyre and through the central channel of the tyre, wherein
   the second tool is a pressure tool including a first and a second pad, which are movable with the slide along said axis, and selectively engage the rigid ring to cause the rigid ring to translate along said axis with respect to the tyre, and to rotate with respect to the tyre about a further axis crosswire to said axis, and
   the first and second pad are located on opposite sides of said axis, and are offset in height, with the first pad located above the second pad.

19. A machine for assembling and disassembling a tyre fitted with a rigid inner run-flat ring located inside a toroidal chamber of the tyre, the machine being a tyre removing machine comprising:

a turntable having an axis;

a tool column located alongside the turntable and having a guide parallel to said axis;

a slide mounted to run along the guide;

actuating means for moving the slide along the guide; and tooling for interacting with the tyre and the rigid inner run-flat ring, the tooling including:

a first tool, which is fitted to the turntable to support the tyre and the rigid ring and supports the tyre over the turntable and at a given distance from the turntable so that the rigid ring can be arranged transversally through a central channel of the tyre; and a second tool fitted to the slide and movable with the slide along the tool column to engage the rigid ring and move the rigid ring with respect to the tyre and through the central channel of the tyre, wherein the second tool is a pressure tool including a first and a second pad, which are movable with the slide along said axis, and selectively engage the rigid ring to cause the rigid ring to translate along said axis with respect to the tyre, and to rotate with respect to the tyre about a further axis crosswire to said axis, and the second tool includes a rod parallel to said axis and connected in an axially adjustable position to the slide, the rod having an inclined lateral appendix extending through said axis and towards the turntable, the first pad being carried by the rod, and the second pad being carried by the appendix.

\* \* \* \* \*